June 17, 1924.  
S. KRUSZYNSKI  
1,498,457  
CULTIVATOR PLANT PROTECTOR  
Filed May 14, 1923  
2 Sheets-Sheet 2
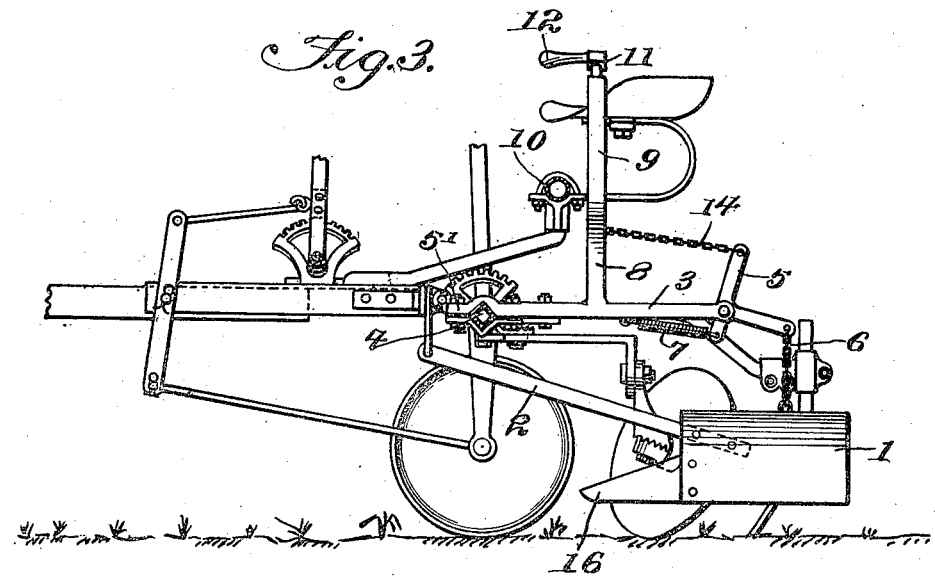
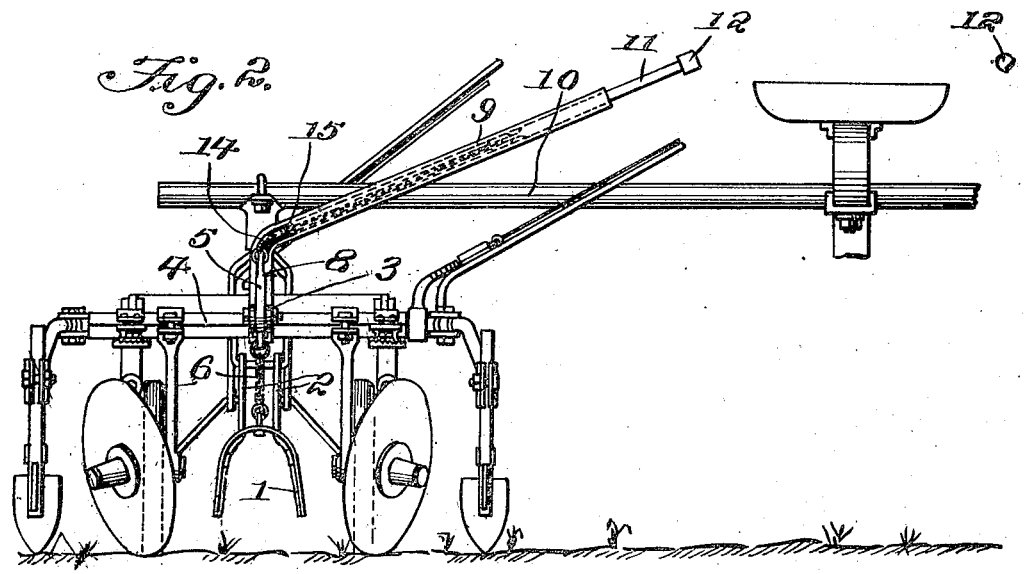
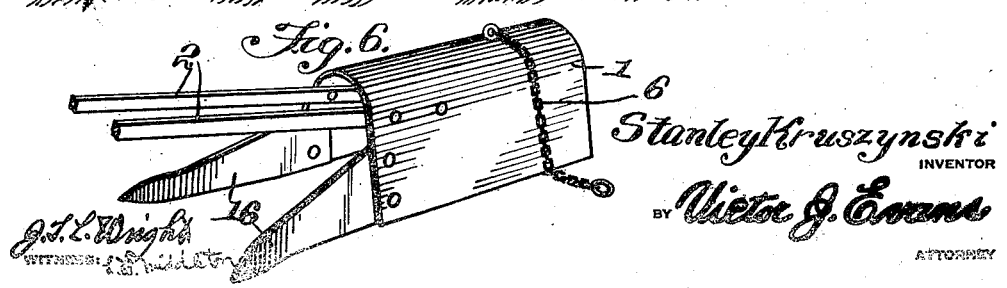

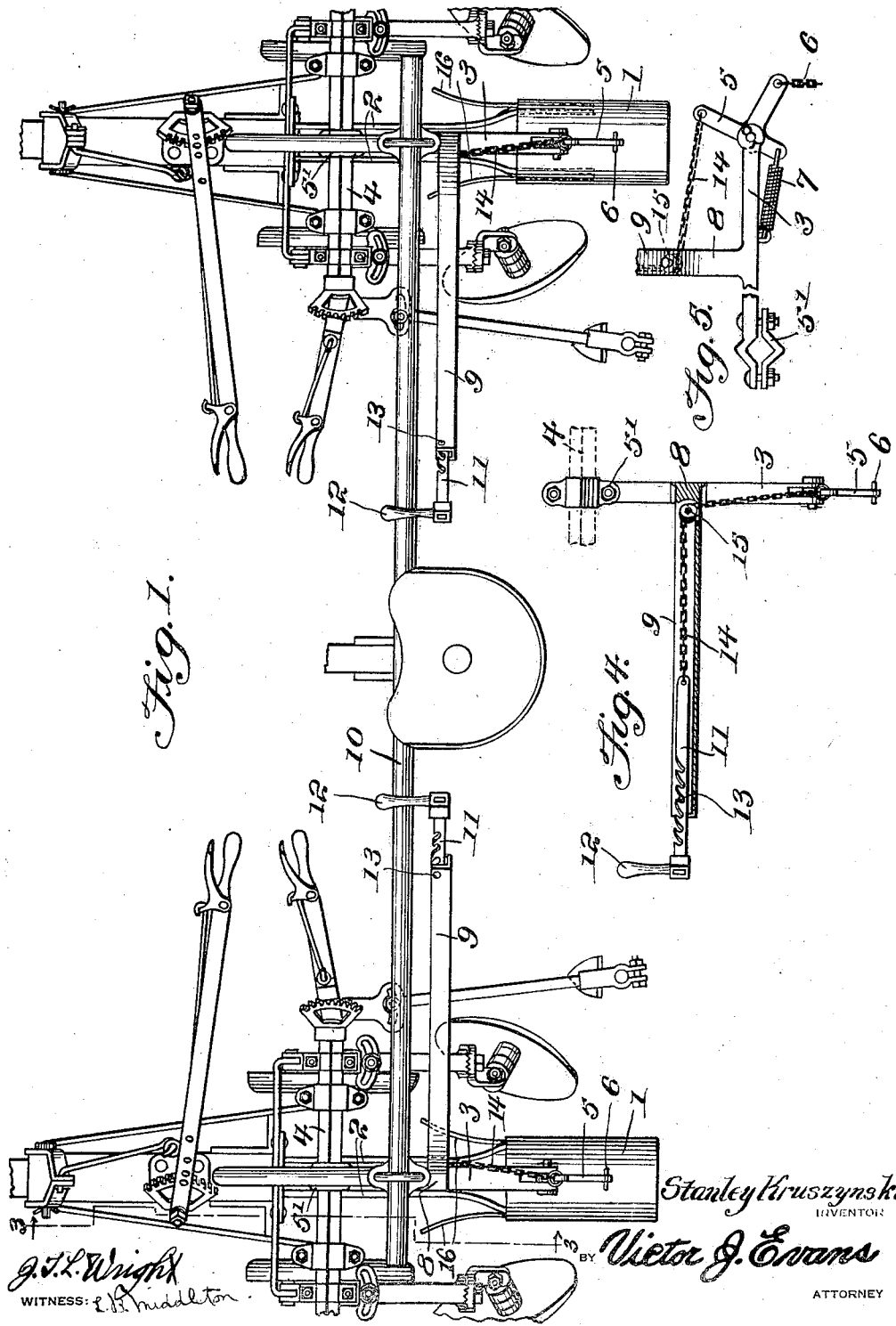

Patented June 17, 1924.

1,498,457

UNITED STATES PATENT OFFICE.

STANLEY KRUSZYNSKI, OF PHILADELPHIA, PENNSYLVANIA.

CULTIVATOR PLANT PROTECTOR.

Application filed May 14, 1923. Serial No. 639,022.

*To all whom it may concern:*

Be it known that I, STANLEY KRUSZYNSKI, a citizen of Poland, residing at Philadelphia, in the county of Philadelphia and State of Pennsylvania, have invented new and useful Improvements in Cultivator Plant Protectors, of which the following is a specification.

This invention relates to improvements in cultivators, the general object of the invention being to provide means for adjusting the plant protecting shield from a point adjacent the driver's seat.

Another object of the invention is to place front extensions on the shield for preventing the dirt from entering the front end of the same.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of a cultivator showing my invention attached thereto.

Figure 2 is a rear view.

Figure 3 is a section on line 3—3 of Figure 1.

Figures 4, 5 and 6 are detail views of the various parts of the invention.

As shown in these views, the shields 1 are connected with the disc beams by the strips 2 in such a manner that the shields can be raised and lowered. The adjusting means for each shield consists of a bar 3 which has one end connected with the disc beam 4 by the clamp 5', the bar extending rearwardly at right angles to the beam. A bell crank lever 5 is pivoted to the rear end of the bar and said bell crank is connected by a chain 6 with the shield 1. A spring 7 tends to hold the bell crank lever in position with the shield engaging the soil. An upright 8 is carried by the bar 3 and the rear end of a slotted bar 9 is connected with the upper end of said upright, said end being beveled so as to support the slotted bar at an angle. The slotted bar is arranged adjacent the seat bar 10 and a rack bar 11 is slidably mounted in the slotted bar. A handle 12 is connected with the rack bar and the parts are so arranged that the handle can be easily grasped by the operator. A stop 13 is arranged to hold the rack bar in adjusted position. A cable 14 connects the rack bar with the bell crank, said cable passing over a pulley 15 in the lower end of the slotted bar.

From the foregoing it will be seen that by adjusting the rack bar the bell crank can be adjusted to place the shield in the desired position relative to the ground so that the quantity of dirt thrown against the plants can be regulated. By permitting the shield to engage the ground the dirt is prevented from being thrown against the plants, this being desirable when the plants are small.

The shield is provided with tapered extensions 16 at its front end for preventing dirt from entering said end.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a cultivator and its shield, a bar connected with the plow beam, a bell crank carried by the bar, a flexible member connecting the bell crank with the shield, a slotted bar supported from the first mentioned bar and extending to a point adjacent the driver's seat, a rack bar slidably mounted in the slotted bar, a handle on the rack bar and a flexible member connecting the rack bar with the bell crank.

In testimony whereof I affix my signature.

STANLEY KRUSZYNSKI.